Feb. 16, 1937.　　C. W. HINMAN　　2,070,902

MACHINE FOR MAKING FASTENER STRIPS

Filed Dec. 28, 1935　　3 Sheets-Sheet 1

Inventor:
Chauncy W. Hinman
By Robert L. Kahn, Atty.

Feb. 16, 1937.　　C. W. HINMAN　　2,070,902
MACHINE FOR MAKING FASTENER STRIPS
Filed Dec. 28, 1935　　3 Sheets-Sheet 2
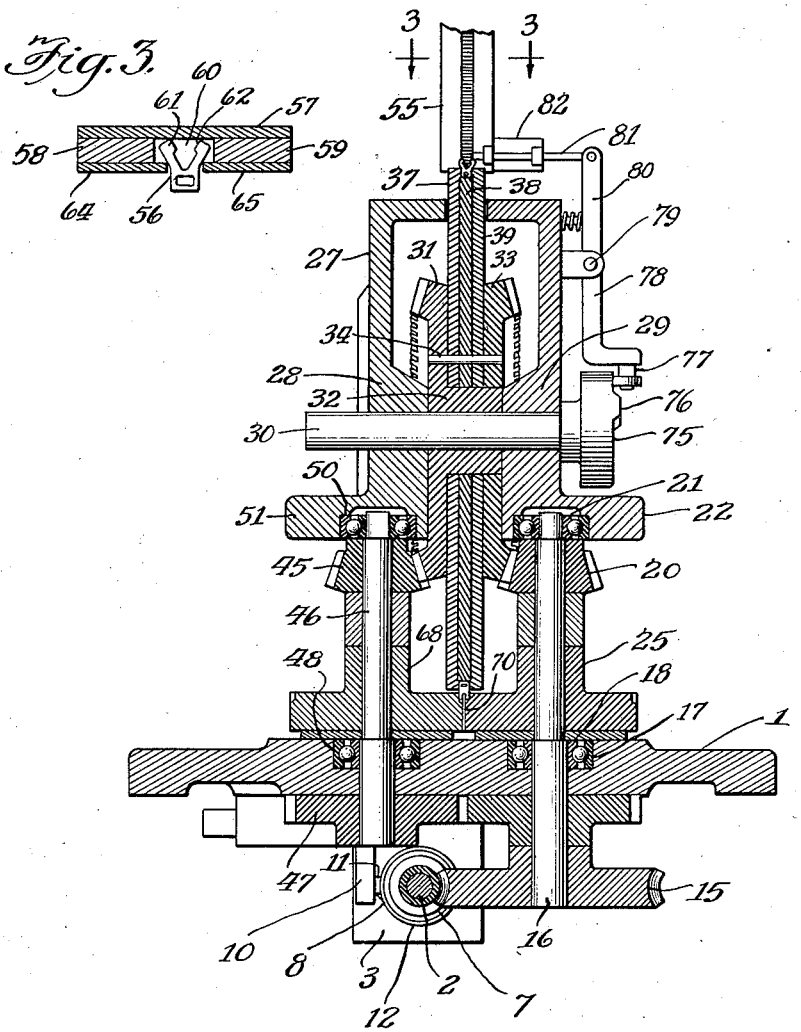

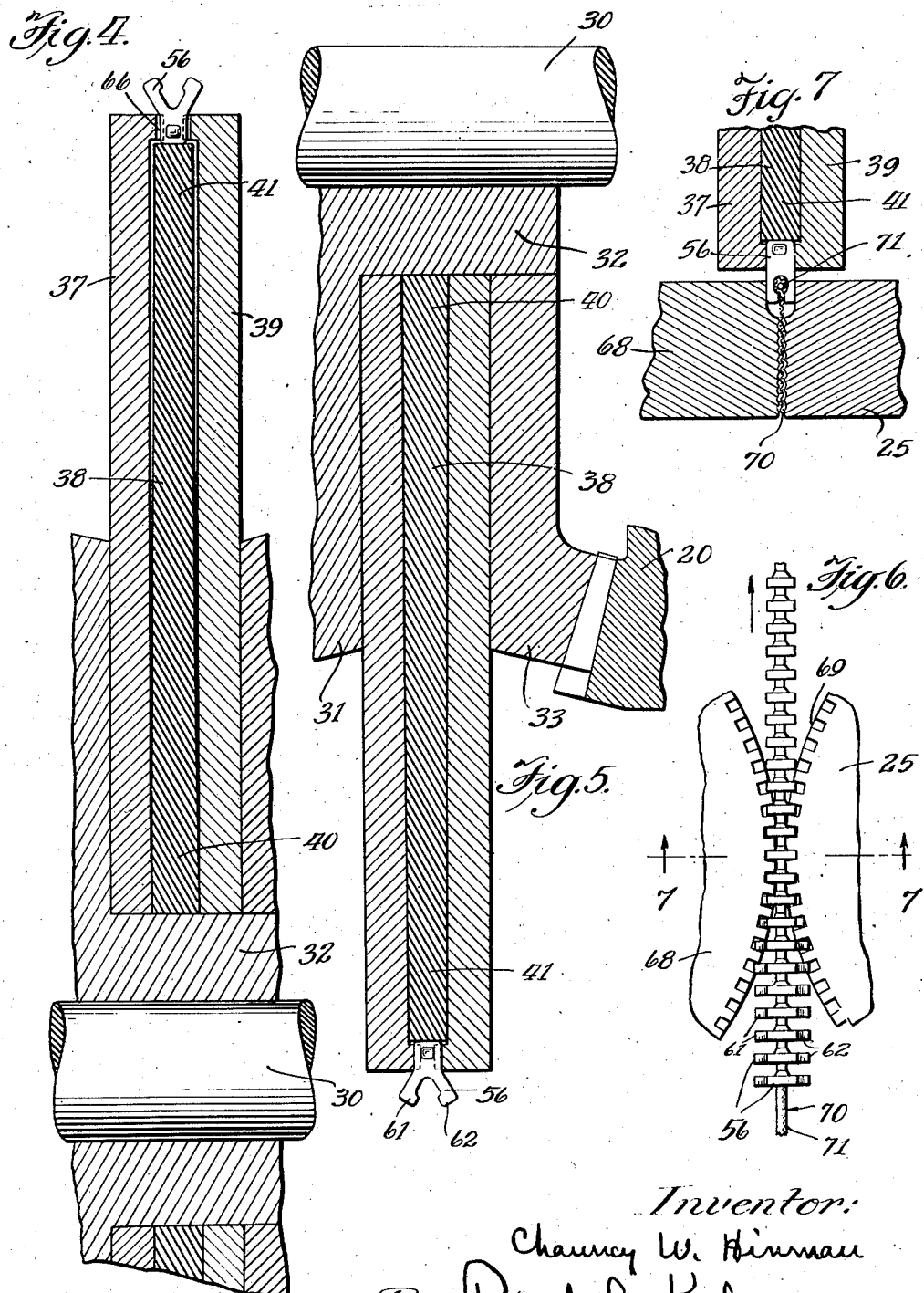

Patented Feb. 16, 1937

2,070,902

UNITED STATES PATENT OFFICE 2,070,902

MACHINE FOR MAKING FASTENER STRIPS

Chauncy W. Hinman, Chicago, Ill., assignor to Lewis E. Pennish, Chicago, Ill.

Application December 28, 1935, Serial No. 56,583

5 Claims. (Cl. 153—1)

This invention relates to machine for making fastener strips, particularly of the slidable fastener type where two rows of cooperating metallic fasteners are firmly secured to tapes.

An object of this invention is to devise a machine of the character which will be simple, cheap and automatically apply such fasteners to the tape.

Referring to the drawings, Figure 1 is a side view of the machine.

Figure 2 is a section along line 2—2 of Figure 1.

Figure 3 is a section along line 3—3 of Figure 2.

Figure 4 is an enlarged sectional detail of the top portion of the rotary fastener retaining member.

Figure 5 is a similar view of the bottom of the retainer of Figure 4.

Figure 6 is a detail of the portion of the machine where the fasteners are secured to the tape.

Figure 7 is a sectional view along line 7—7 of Figure 6.

Figure 1:
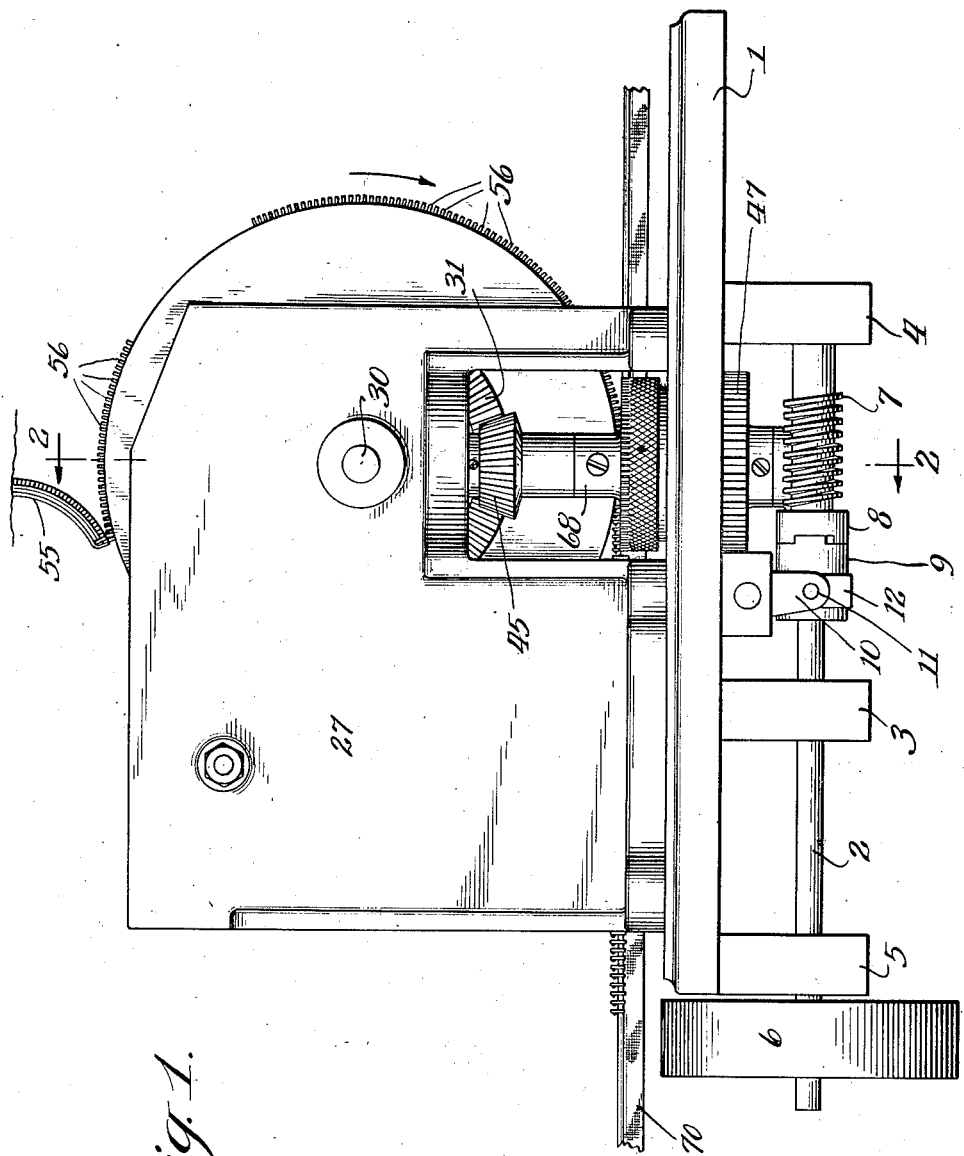

Referring to the drawings and particularly Figure 1, a base 1 is shown below which a shaft 2 is journaled in bearings 3, 4 and 5. One end of shaft 2 carries a pulley 6 which may be connected by a belt, not shown, to any suitable source of power. The other end of shaft 2 carries a worm 7 rigidly connected to a slotted clutch driven member 8, which is adapted to cooperate with another slotted clutch driving member 9, the latter being rotatively locked to shaft 2 by any suitable means but transversely movable by means of a clutch collar 10 having pins 11 riding in a slot 12 in clutch member 9. Clutch collar 10 may be actuated by any suitable means to disengage clutch driving member 9 from the driven clutch member 8. Worm 7 engages a worm gear 15 mounted on a vertical shaft 16, passing through a suitable aperture in base plate 1. The top of base plate 1 is recessed at 17 and a suitable ball-bearing assembly 18 is provided. The upper part of vertical shaft 16 carries a gear 20 rigidly attached thereto with the free end of shaft 16 suitably journaled in a ball bearing assembly 21 disposed in the upper portion 22 of the stationary part of the machine. Below gear 20, a die member 25 is rigidly fastened to shaft 16.

Base 1 carries a super-structure 27 including portion 22 before referred to. This super-structure has a pair of spaced parallel journals 28 and 29, in which a shaft 30 is rotatively mounted. Shaft 30 has rigidly attached thereto a gear 31 carrying a hub portion 32. Another gear 33 corresponding to gear 31 is disposed on hub 32 and spaced from gear 31 but rotatively connected thereto by pin 34. Between oppositely facing gears 31 and 33 are three circular discs 37, 38 and 39. These three discs are loosely carried on hub 32 of gear 31 and are rotatively joined with gears 31 and 33 by means of pin 34. Central disc 38 is smaller in diameter than the two outer discs 37 and 39, which are of equal size. This disc 38 is thicker at its inner portion 40 and tapers down to its periphery 41 just a slight amount.

Referring to Figures 4 and 5, which are enlarged views of these three discs, it will be noted that outer discs 37 and 39 are spaced outwardly slightly from inner disc 38 when above shaft 30. The discs below shaft 30 are pressed tightly together against the sloping sides of disc 38 by the action of gear 20 and its mate 45 disposed on the opposite side of the three discs.

Gear 45 is rigidly joined to a vertical shaft 46 journaled in base plate 1 by a bearing 47 and a ball bearing assembly 48 in the upper part of base plate 1 similar to the corresponding construction on shaft 16. The upper end of shaft 46 is journaled in a ball bearing assembly 50 carried by portion 51 of super-structure 27. Gear 20, which is the driver, meshes with gear 33, which turns gear 31 through pin 34. Gear 31 meshes with gear 45. The two gears 20 and 45 tend to crowd gears 31 and 33 together as above described. Normal machining tolerances are sufficient to give enough play to hub 32 on shaft 30 and members 37, 39 and gear 33 on hub 32 that the tilting action described above will result, whereby outer plates 37 and 39 are spaced slightly above shaft 30 while being pressed together below shaft 30.

A hopper chute 55 of any well-known construction is adapted to feed fastener elements 56. This hopper element, a portion of which is shown in Figure 3, has an inner portion 57 with two spaced bands 58 and 59 spaced apart to form a gap 60 adapted to hold the fastener element 56. This fastener element is in the shape of a V and has jaws 61 and 62 adapted to grip a suitable tape. Beyond spaced guides 58 and 59 are plates 64 and 65, which are adapted to retain fasteners 56 in position.

Fasteners 56 are adapted to drop from hopper chute 55 into slots 66 between outer plates 37 and 39. The clearance is such that fastener elements 56 may drop into position. As gears 31 and 33 rotate the discs, the clearance decreases so that outer discs 37 and 39 grip fasteners 56 in the bottom position just enough to maintain them in place.

The fastener elements 56, when in their bottom position, pass between die 25 and its mate 68, the latter being journaled on shaft 46. These two dies are provided with slots 69 in the upper portion thereof only, these slots being shaped to accommodate the fastener elements 56 therebetween. In the bottom position of the fastener elements, the jaws 61 and 62 extend between the slots in the upper part of dies 25 and 68. The bottom portion of these two dies have generally flat roughened faces between which a tape 70 is adapted to be fed. This tape is preferably provided with a reinforced edge 71, which is adapted to be approximately flush with the upper die surfaces. As is evident from Figure 6, the two sets of slots 69 are so shaped that the jaws 61 and 62 of fastener 56 are forced together against tape 70. The wedging action of discs 37 and 39 on fasteners 56 in the lowermost position is just enough to maintain the fasteners in position freely but not enough to prevent these fasteners from being pulled out when the jaws have been closed around the tape.

It is customary to make up the fasteners in strips of predetermined length and separate such lengths by some blank tape. To do this, shaft 30 carries a cam 75 having a rise 76. A cam follower 77 on the end of a lever 78 pivoted at 79 is provided. The free end 80 of the lever is connected to a rod 81 slidably supported by a bracket 82. The free end of rod 81 is normally clear of the hopper chute 55. But when rise 76 of the cam forces the follower 77 out, rod 81 is pushed in and prevents the fastener elements from dropping.

I claim:

1. A machine for attaching fastener blanks to a tape, said blanks having open jaws adapted to be pressed to grip said tape, said machine comprising a base plate, a pair of spaced vertical shafts, a pair of cylindrical members disposed on said spaced vertical shafts, said members having sufficient thickness and being spaced together close enough so that a tape is frictionally fed between the opposing cylindrical surfaces, the upper peripheral portion of said cylindrical members having notches therein at spaced intervals, the opposing notches, when registering, being adapted to clear the upper part of a fastener element and force the jaws together to grip said tape, means for driving said two members synchronously so that the notches of one register with the notches of the other, a center disc disposed directly above said tape and lying in substantially the same plane therewith, said center disc tapering from the edge outwardly toward the central portion thereof, an additional disc on each side of said central disc, said additional discs being equal to each other and having their edges extending a short distance beyond said central disc, said additional discs having radial slots on the inside thereof for a short distance from their edges to accommodate the edges of fastener elements, means for rotating said three discs simultaneously and in fixed relationship to said cylindrical members so that each fastener element in each pair of radial slots is presented to a pair of registering notches, means for exerting pressure on said additional discs at the bottom only tending to bend said additional discs on said taper of said center disc toward each other so that fastener elements are retained between said additional discs just enough to prevent their falling out but to permit said fastener elements being pulled out when their jaws are forced together by said members to grip said tape, and a hopper above said three discs adapted to drop fastener elements with their jaws out in opposing pairs of slots in said additional discs.

2. A machine for applying fastener blanks to a tape, said fasteners having open jaws which are forced together to clamp said tape, said machine comprising a base, a pair of spaced vertical shafts rotatively mounted in said base, a pair of cylindrical members rotated by said shaft, said members being thick enough to accommodate a tape therebetween and the cylindrical surfaces being close enough to frictionally feed said tape, the upper portion of said members having notches cut out therein of such shape that a pair of registering notches engage a fastener element on opposite sides thereof and then feed said fastener element and tape through, forcing said jaws together around said tape, a shaft horizontally mounted above said cylindrical members, a center disc carried by said shaft above said tape and in the same plane therewith, said disc tapering from its inner portion inwardly toward the outer portion, said disc having its edge a distance above said cylindrical members to accommodate fastener members therebetween, an additional disc on each side of said central disc having its edge extending beyond the edge of said central disc and clearing said cylindrical members, said additional discs having opposed radial slots on the inner surface beyond said central disc, means acting on said additional discs for pressing said additional discs at the bottom thereof toward each other to lie along the taper of said central discs while permitting said additional discs to maintain their normal spacing above said horizontal shaft, means for driving said cylindrical members and discs in fixed relation to each other so that a fastener element in opposed disc slots is pressed in opposed notches, and a hopper above said discs for dropping said fastener elements in said opposed slots.

3. The structure of claim 2, wherein said horizontal shaft carries a gear on the outside of each of said additional discs and, wherein said additional discs and said gears are rotatively locked together and, wherein a pair of gears cooperates with the bottom of said first two gears and presses them together to drive said discs and force them together at the bottom.

4. A machine for applying fastener blanks to a tape, said fasteners being of the type having open jaws adapted to be forced together to embrace said tape, said machine comprising a base, a pair of spaced vertical shafts rotatively mounted in said base, a pair of cylindrical members locked to said shaft above said base, said members being thick enough and having their cylindrical surfaces near enough to feed a tape in a vertical plane, the tops of said members having notches cut of such shape that opposing notches enclose fastener elements and in feeding said fastener elements through force said jaws around said tape, a gear above each cylindrical member carried by each of said shafts and locked thereto, a horizontal shaft disposed above said vertical shafts, a pair of gears carried by said horizontal shaft and meshing with said first pair, a central disc between said gears located above said tape and in the same plane therewith, said central disc tapering from the inner portion inwardly toward the outer portion and the outer portion clearing said cylindrical members just enough to accommodate fastener elements, an additional disc on each side of said central disc and projecting beyond the edge of said central disc and clearing said central members, said additional discs having opposed radial slots at the exposed peripheral inner surface, said two gears and three discs being rotatively locked but otherwise slightly movable with respect to each other, said two gears above said cylindrical members being adapted to press said other two gears together enough to force said additional discs to approach each other enough to retain fastener elements below said horizontal shaft while permitting said additional discs to remain spaced normally above said horizontal shaft, a hopper adapted to feed fastener elements into opposed slots in said additional discs above said horizontal shaft and means for driving one of said shafts whereby said various gears and members are actuated.

5. The machine of claim 4, wherein said horizontal shaft carries a cam and means operated by said cam for cutting off the supply of fastener elements fed from said hopper at predetermined intervals of time during the operation of the machine to make fastener tapes of predetermined lengths.

CHAUNCY W. HINMAN.